(12) United States Patent
Nunez et al.

(10) Patent No.: US 8,252,850 B2
(45) Date of Patent: Aug. 28, 2012

(54) CROSSLINK AGENTS

(75) Inventors: Ivan M. Nunez, Penfield, NY (US); Joseph A. McGee, Canandaigua, NY (US); David E. Seelye, Williamsville, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 5 days.

(21) Appl. No.: 13/004,228

(22) Filed: Jan. 11, 2011

(65) Prior Publication Data

US 2011/0105779 A1 May 5, 2011

Related U.S. Application Data

(62) Division of application No. 12/168,943, filed on Jul. 8, 2008, now Pat. No. 7,901,073.

(60) Provisional application No. 60/948,850, filed on Jul. 10, 2007.

(51) Int. Cl.
*G02B 1/04* (2006.01)
*B29D 11/00* (2006.01)
*C07C 271/00* (2006.01)
*C07C 271/06* (2006.01)

(52) U.S. Cl. ........ 523/106; 523/107; 523/108; 526/264; 526/279; 560/157; 556/420; 556/445; 556/450; 351/359; 351/160 R

(58) Field of Classification Search .................. 351/159, 351/160 R; 528/25, 26; 526/264, 279; 523/106, 523/107, 108; 558/260; 560/157, 205, 231; 556/400, 420, 445, 450

See application file for complete search history.

(56) References Cited

U.S. PATENT DOCUMENTS

| 3,448,088 | A | | 6/1969 | Azorlosa | |
|---|---|---|---|---|---|
| 3,949,021 | A | | 4/1976 | Kunitomo | |
| 4,547,543 | A | | 10/1985 | Shibata | |
| 4,711,943 | A | | 12/1987 | Harvey | |
| 4,789,711 | A | | 12/1988 | Monnier | |
| 5,070,215 | A | | 12/1991 | Bambury | |
| 5,310,779 | A | * | 5/1994 | Lai ............................... | 524/588 |
| 6,822,016 | B2 | | 11/2004 | McCabe | |
| 7,052,131 | B2 | | 5/2006 | McCabe | |
| 7,390,863 | B2 | * | 6/2008 | Salamone et al. ............ | 526/279 |
| 7,402,689 | B2 | * | 7/2008 | Seelye et al. .................. | 556/420 |
| 8,053,489 | B2 | * | 11/2011 | Nunez et al. .................. | 523/106 |
| 2008/0312397 | A1 | * | 12/2008 | Lai et al. ......................... | 528/26 |

OTHER PUBLICATIONS

White et al, Bulk Free-Radical Photopolymerizations of 2-Vinyl-2-Pyrrolidinone and Its Derivatives, J of Polymer Sci, 2002, p. 694-706, vol. 40.

* cited by examiner

*Primary Examiner* — Susan W Berman
(74) *Attorney, Agent, or Firm* — Joseph Barrera

(57) ABSTRACT

Novel crosslink agents are described that provide for the copolymerization of at least one hydrophilic monomer with at least one lens monomer typically used to prepare materials for ophthalmic lenses. The new crosslink agents have a relatively high selectivity for the hydrophilic monomer and limited reactivity with the crosslink agent used to polymerize the lens monomer.

13 Claims, No Drawings

CROSSLINK AGENTS

CROSS-REFERENCE

This application is a divisional application of U.S. patent application Ser. No. 12/168,943 filed Jul. 8, 2008, and which also claims the benefit under 35 U.S.C. §119(e) of U.S. provisional application Ser. No. 60/948,850 filed Jul. 10, 2007, the entire disclosure of which is incorporated herein by reference.

The present invention relates to crosslink agents and the use of the crosslink agents to provide a polymer. The polymer comprises monomeric units of two or more monomers and two or more crosslink agents. The polymer can be used as an optical polymeric material for an ophthalmic lens.

BACKGROUND OF THE INVENTION

Hydrogel contact lens materials prepared with N-vinyl-2-pyrrolidone (NVP) are expected to have a relatively high water content, and thus, an acceptable level of oxygen permeability. For example, NVP is often copolymerized with an alkyl acrylate or methacrylate such as methyl methacrylate to provide lens materials that typically have a water content of 50% to 80% by weight. However, such copolymers are difficult to synthesize in a homogeneous controlled manner because of the difference in the polymerization reaction rates between the N-vinyl groups of NVP and the acryloyl or methacryloyl groups of the alkyl acrylate or methacrylate. One typically observes a phase separation and a corresponding decrease in the transparency of the polymeric lens material, or the mechanical properties of the lens material deteriorates as the lens absorbs water.

In an attempt to overcome the differences between NVP and the alkyl acrylates/methacrylates, U.S. Pat. No. 4,547,543 describes the use of N-methyl-3-methylene-2-pyrrolidone (NMMP). It is stated that NMMP has a polymerization reaction rate more in-line with acrylate/methacrylate monomers, and still provides the necessary hydrophilic character desired of NVP. Accordingly, the '543 patent describes a copolymer consisting essentially of: (a) from 50 to 95 parts by weight of the total monomer units, of which, 25 to 100 parts is NMMP and 0 to 75 parts NVP; and (b) from about 5 to about 50 parts, by weight of the total monomer units, of reinforcing monomer units consisting essentially of at least one monomer selected from the group consisting of alkyl acrylates, alkyl methacrylates, styrene, alkyl styrenes, benzyl acrylate and benzyl methacrylate.

U.S. Pat. No. 3,949,021 describes a somewhat different approach to the above mentioned problem. The '021 patent describes trapping or encapsulating an already formed, water insoluble polymer (e.g., poly(methyl methacrylate), polystyrene, or poly(vinyl acetate) in poly(NVP). Also, U.S. patents by McCabe et al. (U.S. Pat. No. 6,822,016 and U.S. Pat. No. 7,052,131) describe a process of making a polymeric, ophthalmic lens material from a high molecular weight hydrophilic polymer and a silicone monomer. The McCabe process polymerizes the silicon monomer in the presence of an already formed hydrophilic polymer, e.g., poly(NVP) having a molecular weight of no less than about 100,000 Daltons.

Conventional polymer formulations that include two or more free-radical, monomers with two very different reactivity ratios and a single crosslinking agent can provide a polymer in which the two monomers coexist as essentially two homopolymers. During the initial stages of the polymerization reaction one monomer preferentially reacts with the crosslink agent, and only after that monomer is nearly consumed does the second monomer begin to react with the crosslink agent. In some instances, the large difference in the reactivity ratios of the crosslink agent and the second monomer can provide a polymer with relatively large amounts of unreacted second monomer or oligomer, which then must be extracted from the polymer. This is very inefficient in terms of production cost (yields) and can be detrimental to the material properties. Also, it is often difficult to prepare a polymer from one production batch to another and stay within design specifications under such variable reaction conditions.

The theoretical composition of the polymer formed by the reaction of two different monomers (one of which is a crosslink agent) is determined by the following:

$$dn_1/dn_2 = (N_1/N_2)(r_1N_1 + N_2)/(r_2N_2 + N_1)$$

where $n_1$ is the moles of monomer 1 in the copolymer, $n_2$ is the moles of monomer 2 in the copolymer, $N_1$ and $N_2$ are the number of moles of monomers 1 and 2, respectively, in the monomer mixture, and $r_1$ and $r_2$ are the monomer reactivity ratios. The reactivity ratios are defined in terms of propagation rate constants, $k_{11}$, $k_{12}$, $k_{22}$ and $k_{21}$, according to the following polymerization reactions.

$$M_1^* + M_1 \rightarrow M_1^* \qquad k_{11}$$

$$M_1^* + M_2 \rightarrow M_1M_2^* \qquad k_{12}$$

$$M_2^* + M_2 \rightarrow M_1M_2^* \qquad k_{22}$$

$$M_2^* + M_1 \rightarrow M_2M_1^* \qquad K_{21}.$$

and $r_1 = k_{11}/k_{12}$ and $r_2 = k_{22}/k_{21}$.

The invention overcomes the shortcomings that result from attempts to copolymerize at least two monomers with a single crosslink agent if one of the two monomers has a very different reactivity ratio relative to the crosslink agent.

SUMMARY OF THE INVENTION

The invention is directed to crosslink agents of formula I

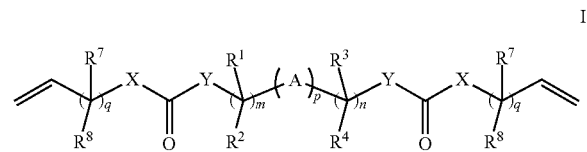

wherein $R^1$, $R^2$, $R^3$, $R^4$, $R^7$ and $R^8$ are independently selected from hydrogen, $C_1$-$C_4$alkyl, $C_1$-$C_2$alkanol or hydroxyl;

A is $[SiR^5R^6O]_w SiR^5R^6$, wherein $R^5$ and $R^6$ are independently selected from $C_1$-$C_4$alkyl or phenyl, and w is from 0 to 60;

m and n are integers independently selected from 1 to 10; p is 1; and q is an integer from 0 to 6; and X and Y are independently selected from O or $NR^9$, wherein $R^9$ is hydrogen, $C_1$-$C_4$alkyl or $C_1$-$C_2$alkanol.

The invention is also directed to crosslink agents of formula II

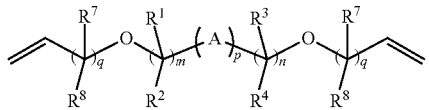

wherein $R^1$, $R^2$, $R^3$, $R^4$, $R^7$ and $R^8$ are independently selected from hydrogen, $C_1$-$C_4$alkyl, $C_1$-$C_2$alkanol or hydroxyl;

A is $[SiR^5R^6O]_w SiR^5R^6$, wherein $R^5$ and $R^6$ are independently selected from $C_1$-$C_4$alkyl or phenyl, and w is from 0 to 60;

m and n are integers independently selected from 1 to 10; p is 1; and q is an integer from 0 to 6.

The invention is also directed to an ophthalmic lens comprising the reaction product of two or more crosslink agents, a hydrophilic monomer and a silicone-containing lens monomer, and at least one of the crosslink agents is of formula I.

DETAILED DESCRIPTION OF THE INVENTION

The invention provides a synthetic route to polymers comprised of at least two monomers, and in particular, at least two vinyl monomers, each with a very different reactivity ratio by using a corresponding crosslink agent for each monomer. Novel crosslink agents are described that allow one to copolymerize at least one hydrophilic monomer, e.g., any N-vinyl lactam, with at least one conventional monomer typically used to prepare polymeric materials for ophthalmic lenses. Hereafter, we will refer to a conventional monomer, some of which are described below, as a "lens monomer". The new crosslink agents have a relatively high selectivity for the hydrophilic monomer and limited reactivity with the crosslink agent used to polymerize the lens monomer.

The invention is also directed to a method of making a hydrophilic crosslinked polymer that comprises at least two monomeric units and at least two different crosslink units. Again, the two different crosslink agents are required because the at least one hydrophilic monomer and the at least one lens monomer do not readily copolymerize. The use of a corresponding crosslink agent for each of the hydrophilic monomer and the lens monomer ensures a mutually compatible polymer. As a result, the amount of hydrophilic monomer or hydrophilic oligomer that is extractable following the polymerization reaction is significantly reduced. The use of the dual crosslink system also provides a route to better control the final chemical, physical and structural characteristics of the resulting polymer.

The invention is directed to crosslink agents of general formula I

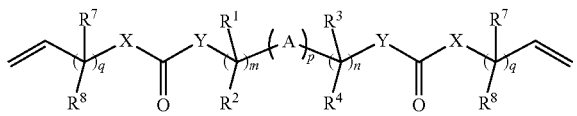

wherein $R^1$, $R^2$, $R^3$, $R^4$, $R^7$ and $R^8$ are independently selected from hydrogen, $C_1$-$C_4$alkyl, $C_1$-$C_2$alkanol or hydroxyl;

A is O, $O(CH_2CH_2O)_v$ or $[SiR^5R^6O]_w SiR^5R^6$, wherein $R^5$ and $R^6$ are independently selected from $C_1$-$C_4$alkyl or phenyl, and v is from 1-20 and w is from 0 to 60;

m and n are integers independently selected from 1 to 10; p is 0 or 1; and q is an integer from 0 to 6; and X and Y are independently selected from O or $NR^9$, wherein $R^9$ is hydrogen, $C_1$-$C_4$alkyl or $C_1$-$C_2$alkanol.

The terms "straight or branched alkyl" and "cyclic hydrocarbon" are aliphatic radicals that can include one or more non-carbon substituent groups, e.g., hydroxyl, amine, carboxy acid, ester or ether.

In one embodiment, Y is $NR^9$ and X is O. In another embodiment, Y is O and X is $NR^9$. In still another embodiment, Y is $NR^9$ and X is $NR^9$. In a particular embodiment, m and n are 2 or 3, p is 0, and $R^1$, $R^2$, $R^3$ and $R^4$ are hydrogen. Also, it is preferred that q is 0, 1 or 2.

The invention is also directed to crosslink agents of general formula II

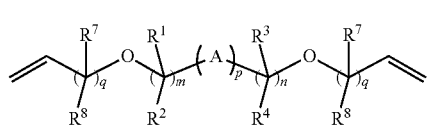

wherein $R^1$, $R^2$, $R^3$, $R^4$, $R^7$ and $R^8$ are independently selected from hydrogen, $C_1$-$C_4$alkyl, $C_1$-$C_2$alkanol or hydroxyl;

A is O, $O(CH_2CH_2O)_v$ or $[SiR^5R^6O]_w SiR^5R^6$, wherein $R^5$ and $R^6$ are independently selected from $C_1$-$C_4$alkyl or phenyl, and v is from 1-20 and w is from 0 to 60;

m and n are integers independently selected from 1 to 10; p is 0 or 1; and q is an integer from 0 to 6.

In a particular embodiment, m and n are 2 or 3, p is 0, and $R^1$, $R^2$, $R^3$ and $R^4$ are hydrogen. Also, it is preferred that q is 0, 1 or 2.

The invention is also directed to a polymer comprising the reaction product of two or more crosslink agents, a hydrophilic monomer and a lens monomer, and at least one of the crosslink agents is of general formula I or general formula II. The polymers can be used to form an ophthalmic lens.

The invention is also directed to a polymer prepared with crosslink agents of general formula III. The polymer is the reaction product of two or more crosslink agents, a hydrophilic monomer and a lens monomer, wherein at least one of the crosslink agents is of general formula III.

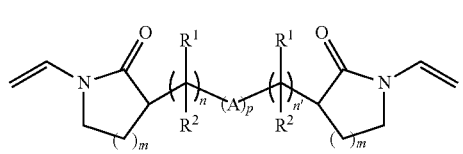

wherein $R^1$ and $R^2$ are independently selected from hydrogen, $C_1$-$C_4$alkyl, $C_1$-$C_2$alkanol or hydroxyl;

A is O, $O(CH_2CH_2O)_v$ or $[SiR^5R^6O]_w SiR^5R^6$, wherein $R^5$ and $R^6$ are independently selected from $C_1$-$C_4$alkyl or phenyl, and v is from 1-20 and w is from 0 to 60;

m is 1, 2 or 3; n and n' are integers independently selected from 1 to 10; and p is 0 or 1.

For example, in one embodiment, m=1, $R^1$ and $R^2$ is hydrogen, n an n' are independently 3, 4 or 5, and p=0.

The described method of copolymerizing a hydrophilic monomer with a lens monomer in the presence of a crosslink agent of general formula I, general formula II or general formula III provides certain advantages if the hydrophilic monomer is a N-vinyl lactam, particularly a N-vinyl lactam selected from the group consisting of N-vinyl pyrrolidone, N-vinyl piperidone and N-vinyl-ε-caprolactam, and mixtures thereof.

The N-vinyl lactams are known to be notoriously sluggish in free radical polymerization reactions with many of the more common acrylate-, methacrylate- or acrylamide-based monomers. Particularly, those acrylate-, methacrylate- or acrylamide-based monomers typically used to provide polymer materials for ophthalmic lenses such as 2-hydroxyethyl methacrylate (HEMA), tris-(trimethylsiloxy)-3-methacryloxypropylsilane (TRIS), dimethylacrylamide (DMA), ethylene glycol dimethacrylate (EGDMA), methacrylic acid (MA), 2-phenylethyl acrylate, 2-phenoxyethyl acrylate, 2-phenoxyethyl methacrylate, triethylene glycol dimethacrylate, tetraethylene glycol dimethacrylate, isobornyl methacrylate, 2-methoxyethyl methacrylate, glycerol methacrylate, monomethoxy polyethyleneglycol (PEG) methacrylate.

For example, previous attempts to copolymerize NVP with any one or more of the lens monomers listed above invariably results in formation of an acrylate, a methacrylate or an acrylamide polymer with very little NVP incorporation. Instead, most of the NVP present in the polymer is present as non-covalently attached homopolymer chains of poly(NVP). These poly(NVP) chains tend to leach out from the polymer over time. The leaching of the poly(NVP) reduces the hydrophilic character of the polymer, and a reduction in water content or wettability is observed with the polymer. Moreover, attempts to copolymerize NVP with one or more siloxane macromonomers described below can lead to a phase separation, and in the case of an ophthalmic lens such phase separation can lead to opacification of the material.

Table 1 lists the reactivity ratios for NVP (monomer 1) and some of the more monomers (monomer 2) typically used to make ophthalmic lens materials. These reactivity ratios are taken from J. Brandrup and E. J. Immergut, "Polymer Handbook", 3rd Ed. Wiley Interscience (1989).

TABLE 1

Reactivity Ratios for NVP.

| monomer 2 | $r_1$ | $r_2$ |
|---|---|---|
| 2-hydroxyethyl methacrylate | −0.019 | 4.841 |
| styrene | 0.057 | 17.20 |
| methyl methacrylate | 0.010 | 4.04 |
| vinyl cyclohexyl ether | 1.91 | −0.110 |
| vinyl isopropyl ether | 0.870 | 0.030 |
| vinyl butyl ether | 1.49 | 0 |
| vinyl benzoate | 2.507 | 0.408 |
| vinyl acetate | 0.340 | 0.195 |
| N-vinyl caprolactam | 2.8 | 1.7 |
| N-vinyl-t-butyl carbamate | 0.4 | 2.4 |
| AMPS | 0.13 | 0.66 |

AMPS: 2-Acrylamido-2-methyl-1-propanesulfonic acid sodium salt:

The method of the invention is particularly useful to copolymerize a polymerization mixture that comprises a hydrophilic monomer that has a reactivity ratio $R_h = k_{hh}/k_{hx}$ and a crosslink agent that has a reactivity ratio $R_x = k_{xx}/k_{xh}$, wherein $k_{hh}$, $k_{hx}$, $k_{xx}$ and $k_{xh}$ are the propagation constants for the following radical polymerization reactions, and $M_h$ represents the hydrophilic monomer, $M_h^*$ represents the hydrophilic monomer radical, $M_x$ represents the crosslink agent, and $M_x^*$ represents the crosslink agent radical,

the ratio $R_h/R_x$ is from 0.1 to 10. The polymerization also comprises a lens monomer that has a reactivity ratio $R_l = k_{ll}/k_{ly}$, and a crosslink agent that has a reactivity ratio $R_y = k_{yy}/k_{yl}$, wherein $k_{ll}$, $k_{ly}$, $k_{yy}$ and $k_{yl}$ are the propagation constants for the following radical polymerization reactions, and $M_l$ represents the lens monomer, $M_l^*$ represents the lens monomer radical, $M_y$ represents the crosslink agent, and $M_y^*$ represents the crosslink agent radical,

the ratio $R_l/R_y$ is from 0.1 to 10. The resulting polymer can be used to form an ophthalmic lens.

In the preparation of many of the polymerization mixtures the hydrophilic monomer and the lens monomer will typically have a relatively large reactivity difference. In other words, if one were to define a reactivity ratio, $R_H/R_L$, based on a similar set of polymerization reactions shown below (the crosslink agent being the same—a single crosslink system), the reactivity ratio should be large, i.e., a 10-fold difference (e.g., greater than 10 or less than 0.1). Accordingly, the hydrophilic monomer and the lens monomer have a reactivity ratio, $R_H/R_L$, greater than 10 or less than 0.1, the reactivity ratio, $R_H/R_L$, is defined the following radical polymerization reactions, wherein $M_h$ represents the hydrophilic monomer, $M_h^*$ represents the hydrophilic monomer, $M_l$ represents the lens monomer, $M_l^*$ represents the lens monomer radical, $M_i$ represents the crosslink agent, and $M_i^*$ represents the crosslink agent radical,

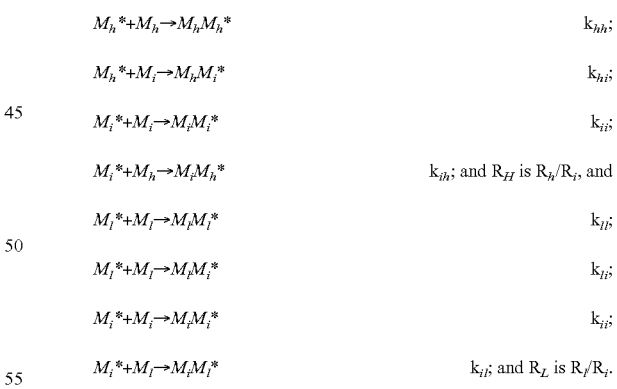

Accordingly, in one embodiment, the hydrophilic monomer is a N-vinyl lactam selected from the group consisting of N-vinyl pyrrolidone, N-vinyl piperidone and N-vinyl-ε-caprolactam and mixtures thereof. Other suitable hydrophilic vinyl monomers include N-vinylimidazolidone, N-vinylsuccinimide and N-vinylforamide. In many instances, however, the hydrophilic monomer will be N-vinyl pyrrolidone.

Exemplary lens monomers that are copolymerized with the one or more hydrophilic monomers include acrylate-, methacrylate- or acrylamide-based monomers. Particularly, those acrylate-, methacrylate- or acrylamide-based monomers typically used to provide polymer materials for ophthalmic lenses such as HEMA, TRIS, DMA, EGDMA, MA, 2-phenylethyl acrylate, 2-phenoxyethyl acrylate, 2-phenoxyethyl methacrylate, triethylene glycol dimethacrylate, tetraethylene glycol dimethacrylate, isobornyl methacrylate, 2-methoxyethyl methacrylate, glycerol monomethacrylate, monomethoxy polyethyleneglycol (PEG) methacrylates The described method is also particularly useful for the preparation of polymeric silicon hydrogels. In this instance, one or more siloxane monomers or macromonomers described below are polymerized with the hydrophilic monomer. In some instances, there can be an advantage of inserting a siloxane linkage in the crosslink agent, that is, A is $[SiR^5R^6O]_vSiR^5R^6$ and p is 1 according to general formula I or of general formula II, for the synthesis of a silicon hydrogel.

1. The Use of the Crosslinking Agent to Make Contact Lens Materials.

Any one or more of known silicon-containing monomers or macromonomers can be combined with the hydrophilic monomer and a crosslink agent of general formula I, general formula II or general formula III to provide a monomer mixture that is then polymerized to provide a siloxane polymer for the manufacture of an ophthalmic lens material.

A particular silicon monomer that can be used is of Structure A.

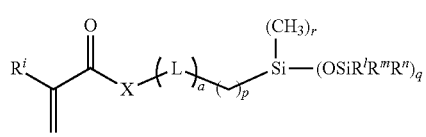

A wherein $R^i$ is H or $CH_3$, q is 1 or 2 and for each q, $R^l$, $R^m$ and $R^n$ are independently selected from ethyl, methyl, benzyl, phenyl or a monovalent siloxane chain comprising from 1 to 30 repeating Si—O units, p is an integer from 1 to 10, r=(3−q), X is O, NH or N($C_{1-4}$alkyl), a is 0 or 1, and L is a divalent linking group which preferably comprises from 2 to 5 carbons, which may also optionally comprise ether or hydroxyl groups, for example, a poly(ethylene glycol) chain.

Examples of the silicone-containing monomers of Structure A that can be used are (3-methacryloyloxypropyl)bis(trimethylsiloxy)methylsilane, (3-methacryloyloxypropyl)-pentamethyldisiloxane, (3-methacryloyloxy-2-hydroxypropyloxy)bis(trimethylsiloxy)methylsilane.

Preferred silicone-containing monomers are monomethacryloyloxyalkyl-terminated polydimethylsiloxanes ("mP-DMS"), such as those shown in structure B.

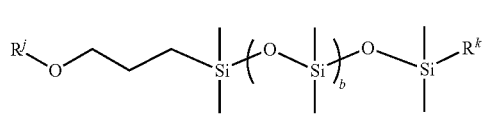

B where b=0 to 100, and $R^k$ is any $C_{1-10}$ aliphatic or aromatic group which can include hetero atoms; provided that $R^k$ is not functionalized at the point at which it is bonded to Si. Preferably, $R^k$ is a $C_{3-8}$ alkyl groups with butyl groups, particularly sec-butyl groups, being most preferred. $R^j$ is an ethylenically unsaturated moiety; preferably a single polymerizable vinyl group. More preferably, $R^j$ is a methacryl moiety but it can also be an acryl or styrenic moiety or other similar moiety.

Other silicon-containing monomers that can be used include (3-methacryloxypropyl)tris(trimethylsiloxy)silane (TRIS), amide analogs of TRIS described in U.S. Pat. No. 4,711,943, and the vinylcarbamate or carbonate analogs described in U.S. Pat. No. 5,070,215.

Examples of some other silicon-containing monomers include bulky polysiloxanylalkyl (meth)acrylic monomers. An example of bulky polysiloxanylalkyl (meth)acrylic monomers are represented by Structure C:

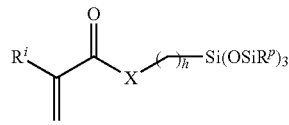

C wherein X denotes O or $NR^i$; h is an integer from 1 to 10;
each $R^i$ independently denotes hydrogen or methyl; and each $R^p$ independently denotes a lower alkyl radical, phenyl radical or a group represented by

wherein each $R^q$ independently denotes a lower alkyl or phenyl radical.

Another class of representative silicon-containing monomers includes silicone-containing vinyl carbonate or vinyl carbamate monomers such as:

1,3-bis[4-vinyloxycarbonyloxy)but-1-yl]tetramethyldisiloxane;

1,3-bis[4-vinyloxycarbonyloxy)but-1-yl]polydimethylsiloxane;

3-(trimethylsilyl)propyl vinyl carbonate;

3-(vinyloxycarbonylthio)propyl-[tris(trimethylsiloxy)silane];

3-[tris(trimethylsiloxy)silyl]propyl vinyl carbamate;

3-[tris(trimethylsiloxy)silyl]propyl allyl carbamate;

3-[tris(trimethylsiloxy)silyl]propyl vinyl carbonate;

t-butyldimethylsiloxyethyl vinyl carbonate;

trimethylsilylethyl vinyl carbonate; and trimethylsilylmethyl vinyl carbonate.

Examples of silicon-containing vinyl carbonate or vinyl carbamate monomers are represented by Structure D:

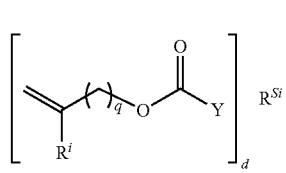

D wherein:
Y denotes O, S or NH;
$R^{Si}$ denotes a silicone-containing organic radical;
$R^i$ denotes hydrogen or methyl;
d is 1, 2, 3 or 4; and q is 0 or 1.

Suitable silicone-containing organic radicals $R^{Si}$ include the following: $-(CH_2)_nSi[(CH_2)_mCH_3]_3$; $-(CH_2)_nSi[OSi(CH_2)_mCH_3]_3$; $-(CH_2)_nSi[OSi(R^r)_3]_3$—$(CH_2)_n[Si(R^r)_2O]_e Si(R^r)_3$; and $-(CH_2)_n[Si(R^r)_2O]_eM$, wherein: M is represented by

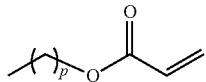

wherein p is 1 to 6;

$R^r$ denotes an alkyl radical or a fluoroalkyl radical having 1 to 6 carbon atoms;

e is an integer from 1 to 200; n is 1, 2, 3 or 4; and m is 0, 1, 2, 3, 4 or 5.

An example of a particular species within Structure D is represented by Structure E.

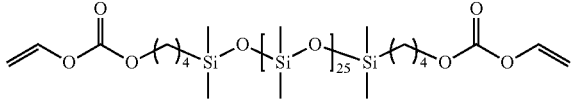

E

Another class of silicon-containing monomers includes polyurethane-polysiloxane macromonomers (also sometimes referred to as prepolymers), which may have hard-soft-hard blocks like traditional urethane elastomers. Examples of silicone urethane monomers are represented by general Formulae IV and V:

$$E(*D*A*D*G)_a*D*A*D*E'; \text{ or} \quad (IV)$$

$$E(*D*G*D*A)_a*D*G*D*E'; \quad (V)$$

wherein:

D denotes an alkyl diradical, an alkyl cycloalkyl diradical, a cycloalkyl diradical, an aryl diradical or an alkylaryl diradical having 6 to 30 carbon atoms;

G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

a is at least 1;

A denotes a divalent polymeric radical of Structure F:

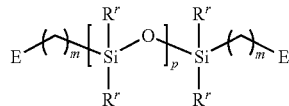

F wherein:

each $R^r$ independently denotes an alkyl or fluoro-substituted alkyl group having 1 to 6 carbon atoms which may contain ether linkages between carbon atoms;

m is at least 1; and p is a number which provides a moiety weight of 400 to 10,000;

E denotes a polymerizable unsaturated organic radical represented by Structure G:

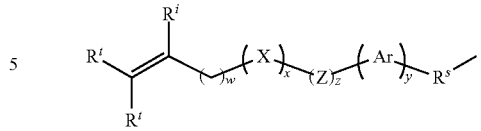

G wherein:

$R^i$ is hydrogen or methyl;

$R^t$ is hydrogen, an alkyl radical having 1 to 6 carbon atoms, or a $-CO-Y-R^u$ radical wherein Y is O, S or NH;

$R^s$ is a divalent alkylene radical having 1 to 10 carbon atoms;

$R^u$ is a alkyl radical having 1 to 12 carbon atoms;

X denotes CO or OCO;

Z denotes O or NH;

Ar denotes an aromatic radical having 6 to 30 carbon atoms;

w is an integer from 0 to 6; x is 0 or 1; y is 0 or 1; and z is 0 or 1.

An example of another silicon-containing monomer that can be combined with a silicone/epoxy-containing monomer are shown by Structure J

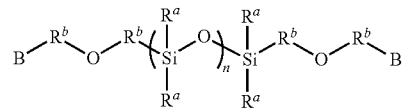

J wherein B is represented by

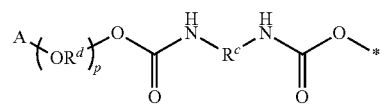

and A is represented by

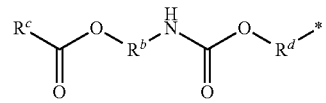

and wherein: $R^a$ independently denote a $C_1$-$C_6$ alkyl; $R^b$ independently denotes a $C_1$-$C_6$ alkylene; $R^c$ independently denote a linear or branched alkylene; $R^d$ independently denote a $C_1$-$C_2$ alkylene; $R^e$ independently denotes a $C_1$-$C_6$ alkylene; m and p are integers independently selected form the integers from 3 to 44; and n is an integer from 13 to 80, and the silicon-containing monomer has a number-average molecular weight of 2000 to 10,000.

A more specific example of a silicone-containing urethane monomer is represented by Structure H.

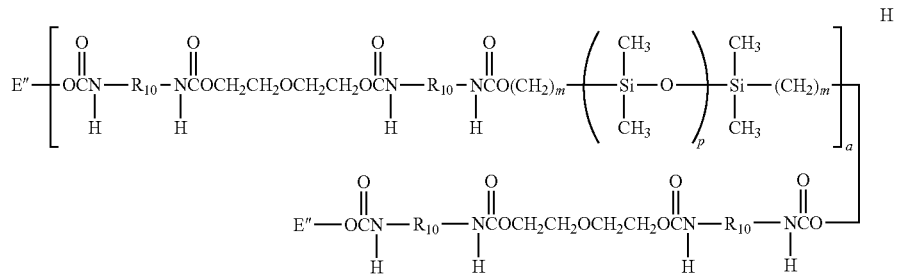

wherein m is at least 1 and is preferably 3 or 4, a is at least 1 and preferably is 1, p is an integer which provides a moiety weight of 400 to 10,000 and is preferably at least 30, $R_{10}$ is a diradical of a diisocyanate after removal of the isocyanate group, such as the diradical of isophorone diisocyanate, and each E″ is a group represented by:

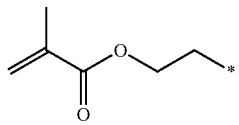

The silicone hydrogels after hydration of the polymers will typically comprise from 10 to 60 weight percent water, or 25 to about 50 weight percent water, of the total weight of the silicone hydrogel.

The silicon hydrogel materials can also be characterized as having low haze, good wettability and modulus. Haze is measured by placing test lenses in saline in a clear cell above a black background, illuminating from below with a fiber optic lamp at an angle 66° normal to the lens cell, and capturing an image of the lens from above with a video camera. The background-subtracted scattered light image is quantitatively analyzed, by integrating over the central 10 mm of the lens, and then compared to a −1.00 diopter CSI Thin Lens®, which is arbitrarily set at a haze value of 100, with no lens set as a haze value of 0.

Wettability is measured by measuring the dynamic contact angle or DCA at 23° C. with borate buffered saline, using a Wilhelmy balance. The wetting force between the lens surface and borate buffered saline is measured using a Wilhelmy microbalance while the sample is being immersed into or pulled out of the saline. The following equation is used $$F = 2\gamma\rho \cos\theta$$

where F is the wetting force, γ is the surface tension of the probe liquid, ρ is the perimeter of the sample at the meniscus and θ is the contact angle. Typically, two contact angles are obtained from a dynamic wetting experiment, i.e., the advancing contact angle and the receding contact angle. The advancing contact angle is obtained from the portion of the wetting experiment where the sample is being immersed into the test liquid. At least four lenses of each composition are measured and the average is reported.

The silicon hydrogel materials have a modulus of at least about 30 psi, preferably from 30 psi to 110 psi, or between 40 psi and 70 psi. Modulus is measured by using the crosshead of a constant rate of movement type tensile testing machine equipped with a load cell that is lowered to the initial gauge height. A suitable testing machine includes an Instron model 1122. A dog-bone shaped sample having a 0.522 inch length, 0.276 inch "ear" width and 0.213 inch "neck" width is loaded into the grips and elongated at a constant rate of strain of 2 in/min. until it breaks. The initial gauge length of the sample (Lo) and sample length at break (Lf) are measured. Twelve specimens of each composition are measured and the average is reported. Tensile modulus is measured at the initial linear portion of the stress/strain curve.

The silicon hydrogel materials have $O_2$ Dk values between 40 barrer and 300 barrer, determined by the polarographic method. Lenses are positioned on the sensor then covered on the upper side with a mesh support. The lens is exposed to an atmosphere of humidified 21 wt % oxygen. The oxygen that diffuses through the lens is measured using a polarographic oxygen sensor consisting of a 4 mm diameter gold cathode and a silver ring anode. The reference values are Balafilcon A lenses (Bausch & Lomb) which have a Dk value of about 80 barrer.

2. The Use of the Crosslinking Agent to Make Intraocular Lens Materials.

For application as an intraocular lens, polymeric materials are prepared with the crosslink agent of general formula I, or of general formula II, a hydrophilic monomer and a lens monomer. The resulting polymer is of sufficient optical clarity, and will have a relatively high refractive index of approximately 1.40 or greater.

An exemplary listing of lens monomers used to make intraocular lenses include:

$C_1$-$C_{10}$ alkyl methacrylates (e.g., methyl methacrylate, ethyl methacrylate, propyl methacrylate, butyl methacrylate, octyl methacrylate, or 2-ethylhexyl methacrylate; $C_1$-$C_{10}$ alkyl acrylates (e.g., methyl acrylate, ethyl acrylate, propyl acrylate, n-butyl acrylate, n-hexyl acrylate, 2-ethylhexyl acrylate or 2-ethoxyethyl acrylate; $C_6$-$C_{40}$ arylalkyl acrylates (e.g., 2-phenylethyl acrylate, 2-phenoxyethyl acrylate, 2-phenoxyethyl methacrylate, benzyl acrylate, 3-phenylpropyl acrylate, 4-phenylbutyl acrylate, 5-phenylpentyl acrylate, 8-phenyloctyl acrylate, or 2-phenylethoxy acrylate; and $C_6$-$C_{40}$ arylalkyl methacrylates (e.g., 2-phenylethyl methacrylate, 3-phenylpropyl methacrylate, 4-phenylbutyl methacrylate, 5-phenylpentyl methacrylate, 8-phenyloctyl methacrylate, 2-phenoxyethyl methacrylate, 3,3-diphenylpropyl methacrylate, 2-(1-naphthylethyl)methacrylate, benzyl methacrylate, or 2-(2-naphthylethyl)methacrylate.

Alternatively, the $C_6$-$C_{40}$ arylalkyl acrylates can be defined by the following formula:

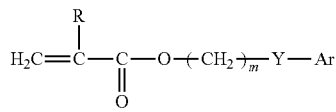

wherein: R is H or $CH_3$; m is 0-10;

Y is nothing, O, S, or NR wherein R is H, $CH_3$ or another lower alkyl, iso-$OC_3H_7$, phenyl or benzyl;

Ar is any aromatic ring, e.g., phenyl, which can be unsubstituted or substituted with H, $CH_3$, $C_2H_5$, n-$C_3H_7$, iso-$C_3H_7$, $OCH_3$, $C_6H_{11}$, Cl, Br or OH.

Reinforced cross-linked silicone elastomers can be prepared with the crosslink agent of general formula I, or of general formula II, and a hydrophilic vinyl monomer. These silicon elastomers will include a siloxane polymer containing 12 to 18 mol percent of aryl substituted siloxane units of the formula $R^4R^5$—SiO. In the formula, $R^4$ and $R^5$ are the same or different and represent phenyl, mono-lower alkyl substituted phenyl groups, or di-lower alkyl substituted phenyl groups. Preferably both $R^4$ and $R^5$ are phenyl. The siloxane polymer will have end blockers containing siloxane units of the formula $R^1R^2R^3$—$SiO_5$ wherein $R^1$ and $R^2$ are alkyl, aryl or substituted alkyl or substituted aryl groups, and $R^1$ and $R^2$ can be the same or different. The $R^3$ group of the end blocking siloxane units is an alkenyl group. Preferably, the end blocker is a dimethylvinyl siloxane unit.

The balance of the polymer consists of dialkyl siloxane units of the formula $R^6R^7$—SiO wherein $R^6$ and $R^7$ are the same or different from and are methyl or ethyl groups, and the polymer has a degree of polymerization from 100 to 2000. Preferably, $R^6$ and $R^7$ are both methyl, and the degree of polymerization is approximately 250.

A trimethyl silyl treated silica reinforcer is finely dispersed in the polymer, in a weight ratio of approximately 15 to 45 parts of the reinforcer to 100 parts of the polymer. Preferably, there is approximately 27 parts of reinforcer to 100 parts of the copolymer.

Polymeric materials prepared with the crosslink agent of general formula I, or of general formula II, and a hydrophilic vinyl monomercan be prepared by polymerizing the following monomeric components:

(A) 5% to 25% by weight of acrylate represented by the general formula

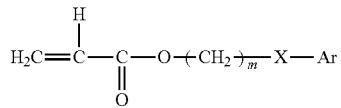

wherein Ar represents an aromatic ring of which hydrogen atom may be substituted by a substitutional group, X represents an oxygen atom or a direct bonding, and m represents an integer from 1 to 5;

(B) 50% to 90% by weight of 2-hydroxyethyl (meth)acrylate; and (C) 5% to 45% by weight of a (meth)acrylate monomer though not of the formula that represent monomer (A) and not 2-hydroxyethyl (meth)acrylate. Also, the coefficient of water absorption of the homopolymer of monomer (C) is not more than 30% by weight. The coefficient of water absorption ($H_2O_{abs.}$%) is defined as the following equation: $H_2O_{abs.}\%=[(W_h-W_d)/W_d]\times 100$ wherein the value is calculated at 25° C. by using a sample 1 mm thick; $W_h$ represents a weight (g) of the sample in an equilibrium state with water, and $W_d$ represents a weight (g) of the sample in a dry state. The water content (% Water) is given by the following formula:

% Water=$[(W_h-W_d)/W_h]\times 100$

An exemplary listing of (meth)acrylate monomer (C) include an alkyl (meth)acrylate containing a straight chain, a branched chain or cyclic chain such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, nonyl (meth)acrylate, stearyl meth)acrylate, octyl (meth)acrylate, decyl (meth)acrylate, lauryl (meth)acrylate, pentadecyl (meth)acrylate, 2-ethylhexyl (meth)acrylate, cyclopentyl (meth)acrylate, (meth)acrylate, cyclohexyl (meth)acrylate: an alkyl (meth)acrylate containing 1 to 5 carbon atoms of alkyl group: a hydroxyalkyl (meth)acrylate containing a straight chain, a branched chain or cyclic chain, except for 2-HE(M)A (B), and any mixture thereof. Among the alkyl methacrylates those containing 1 to 3 carbon atoms of alkyl group are preferred. Among the hydroxyalkyl methacrylates those containing 3 to 6 carbon atoms of hydroxyalkyl group are preferred.

Polymeric materials can be prepared with a crosslink agent general formula I, general formula II or general formula III, and a hydrophilic vinyl monomer by copolymerizing a specific monomer mixture comprising perfluorooctylethyloxypropylene (meth)acrylate, 2-phenylethyl (meth)acrylate, and an alkyl (meth)acrylate monomer having the following general formula,

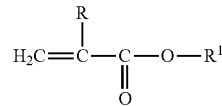

wherein R is hydrogen or methyl and $R^1$ is a linear or branched $C_4$-$C_{12}$ alkyl group. The perfluorooctylethyloxypropylene (meth)acrylate is present from 5% to 20% by weight, the 2-phenylethyl (meth)acrylate is present from 40% to 60% by weight, the alkyl (meth)acrylate monomer is present from 30% to 50% by weight and the crosslinking agent is present from 0.5% to 4% by weight.

The above described polymeric materials are prepared by generally conventional polymerization methods from the respective monomeric components. A polymerization mixture of the monomers in the selected amounts is prepared. To this mixture is added a crosslink agent of general formula I, or of general formula II, at least one other crosslink agent particularly suited for an acrylate- methacrylate- or acrylamide-based monomer and a conventional thermal free-radical initiator. The mixture is introduced into a mold of suitable shape to form the optical material and the polymerization initiated by gentle heating. Typical thermal, free radical initiators include peroxides, such as benzophenone peroxide, peroxycarbonates, such as bis-(4-t-butulcyclohexyl) peroxydicarbonate, azonitriles, such as azobisisobytyronitrile, and the like. A preferred initiator is bis-(4-t-butylcyclohexyl) peroxydicarbonate (PERK).

Alternatively, the monomers can be photopolymerized by using a mold which is transparent to actinic radiation of a wavelength capable of initiating polymerization of these acrylic monomers and crosslink agents. Conventional photoinitiator compounds, e.g., a benzophenone-type photoinitiator, can be introduced to facilitate the photo-polymerization.

EXAMPLES

Example 1

Preparation of 1,6-Hexanediol his (N-vinyl carbamate)

A flame dried, 3-neck 250 mL round bottom flask (RBF) was fitted with a Friedrich reflux condenser (set to cool at 2.5° C.), a temperature monitoring probe and a 60 mL addition funnel with a pressure equalizing arm. The system was maintained under a slight $N_2$ pressure. To the RBF were then charged 120 mL of anhydrous THF, 200 µL of dibutyltin dilaurate (approx. 0.2% mol relative to OH groups) and 10 g of 1,6-hexanediol (0.085 mol). The components were allowed to mix at room temperature.

To the 60 mL addition funnel (thoroughly dried with a flame torch) 15 g of N-vinyl isocyanate (0.217 mol) and 40 mL of anhydrous THF was added via syringe through a septum to prevent exposure to moisture. The N-vinyl isocyanate in THF was slowly added to the RBF to prevent excessive heating as this reaction is fairly exothermic. Alternatively, the addition can be carried out at 0° C. to 5° C. by means of a water-ice bath. The addition of the N-vinyl isocyanate in THF is conducted over a 2 hr period. The contents of the RBF are slowly stirred at room temperature for 24 hrs over nitrogen. Removal of the solvent provides the product as a white powder that can be further dried by letting it sit under vacuum (20-30 mmHg) for 24-48 hrs. Typical yields range from 95-99% by weight.

Example 2

Diethyleneglycol bis(N-vinyl carbamate)

A flame dried, 3-neck 250 mL round bottom flask (RBF) was fitted with a Friedrich reflux condenser (set to cool at 2.5° C.), a temperature monitoring probe and a 60 mL addition funnel with a pressure equalizing arm. The system was maintained under a slight $N_2$ pressure. To the RBF were then charged 75 mL of anhydrous methylene chloride, 150 µL of dibutyltin dilaurate (approx. 0.25% mol relative to OH groups) and 6 g of diethyleneglycol (0.0565 mol). The components were allowed to mix at room temperature. To the 60 mL addition funnel (thoroughly dried with a flame torch) 10 g of N-vinyl isocyanate (0.145 mol) and 50 mL of anhydrous methylene chloride was added via syringe through a septum to prevent exposure to moisture.

The N-vinyl isocyanate in methylene chloride was slowly added to the RBF to prevent excessive heating as this reaction is fairly exothermic. Alternatively, the addition can be carried out at 0° C. to 5° C. by means of a water-ice bath. The addition is conducted over a 2 hr period. The contents of the RBF are then slowly stirred at room temperature for 24 hrs. Removal of the solvent provides the product as a white powder that can be further dried by letting it sit under vacuum (20-30 mmHg) for 24-48 hrs. Typical yields range from 95-99% by weight. The product can be purified by recrystallization from ethyl ether/hexane.

Example 3

Synthesis of 1,12-bis-(3-(−1-vinyl-2-pyrrolidinonyl) dodecane

The synthetic procedure described in White, et al., *J. of Polymer Science Part A: Polymer Chemistry* Vol. 40, 694-706, (2002) was followed. All glassware was oven dried at 160° C. prior to use. N-vinyl-2-pyrrolidinone (NVP) was distilled and placed over 4 Å molecular sieves for 24 hrs before use. All other reagents were used as received from Aldrich chemical Co. A 250 ml, three-neck flask was fitted with an addition funnel, an $N_2$ inlet, magnetic stirrer, rubber septum and thermocouple probe. The flask was charged with lithium bis(trimethylsilyl)amide (LTMSA) 82 mL (1.0 molar solution in THF), 0.82 mol and then stirred in a dry ice/acetone bath to about −76° C. NVP (9 mL, 0.084 moles) in THF (9 mL) was added drop wise over approximately 30 minutes. The reaction stirred for an additional 1 hr. 1,12-dibromododecane (12.8 g, 0.039 moles) in 10 ml THF was added to the reaction flask drop wise. The mixture was stirred for 1 hr at less than −74° C. and then allowed to reach room temperature. Stirring continued for 48 hours. A sample was taken, quenched with water and extracted with ether. GC analysis showed no evidence of 1,12-dibromododecane (I) remaining in the reaction mixture.

The reaction was quenched with 50 mL of purified water and the organic layer was removed. The water layer was extracted 3×50 mL of ether; the organic layers were combined and dried over magnesium sulfate. Flash evaporation provided 13.3 grams of crude material which was analyzed by GC-Mass spectroscopy and contained NVP monomer, 1-(−3-vinyl-2-pyrrolidinonyl)-12-bromododecane and the desired product. The crude yield is 88%. The crude material was purified by silica gel column chromatography using ethylacetate/heptane (70/30) as an eluting solvent. Fractions I and II appeared to contain the major product. The first fraction was 6.1 grams, of viscous oil and the second fraction was 3.05 grams of a semisolid.

Examples 4 and 5

Preparation of a Silicon Hydrogels

Silicon hydrogel materials were prepared from the polymerization mixtures listed in Table 2. The polymerization reaction was conducted using methods well known by those of ordinary skill in the art. The vinyl crosslink agent used in the polymerization was 1,6-hexanediol-bis-(N-vinyl carbamate), and is reported in weight percent based on the total weight of the polymerization mixture. M2D39 is diquat, siloxane monomer shown below, and Tris is tris-(trimethylsiloxy)-3-methacryloxypropylsilane.

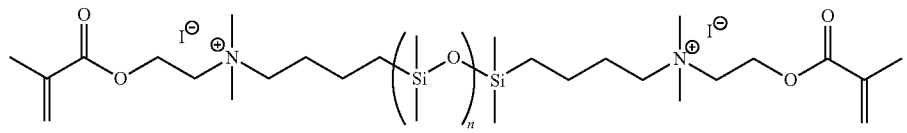

TABLE 2

| Component (parts) | Ex. 4 | Ex. 5 | Comp. Ex. 1 |
|---|---|---|---|
| M2D39 | 9.3 | 9.3 | 9.3 |
| Tris | 23.25 | 23.25 | 23.25 |
| NVP | 41.85 | 41.85 | 41.85 |
| HEMA | 18.6 | 18.6 | 18.6 |
| Propylene glycol | 5 | 5 | 5 |
| AIBN | 0.5 | 0.5 | 0.5 |
| vinyl crosslink (wt %) | 0.5 | 1.0 | 0 |

The silicon hydrogel films of Table 2 were dried released from their respective molds and weighed. The films were then extracted with water overnight, or with isopropanol overnight (approximately 16 hrs) or for 2 hrs. The extracted films were then dried at 100° C. for 18-24 hrs at reduced pressure (30 mmHg) and the dry weight recorded. Table 3 summarizes the weight percent of the extracted compounds from the films, which includes the diluent, propylene glycol.

TABLE 3

| Example | water (16 hrs) | IPA (16 hrs) | IPA (2 hrs) |
|---|---|---|---|
| 4 | 7.11 | 9.83 | 4.37 |
| 5 | 6.05 | 9.66 | 3.77 |
| Comp. 1 | 11.29 | 14.16 | 13.16 |

Examples 6A to 6C

Preparation of a Silicon Hydrogels

Silicon hydrogel materials were prepared from the polymerization mixtures listed in Table 4. The polymerization reaction was conducted using methods well known by those of ordinary skill in the art. The vinyl crosslink agent used in the polymerization was 1,6-hexanediol-bis-(N-vinyl carbamate), and is reported in weight percent based on the total weight of the polymerization mixture. The silicon hydrogel films were dried released from their respective molds and weighed. The films were then extracted as indicated in Table 3. The extracted films were then dried at 100° C. for 18-24 hrs at reduced pressure (30 mmHg) and the dry weight recorded. The polymerization and subsequent extraction for each formulation was repeated five times. The extraction data is also reported in Table 4 with the standard deviation for the repeated experiments.

Examples 7A to 7C

Preparation of a Silicon Hydrogels

Silicon hydrogel materials were prepared from the polymerization mixtures listed in Table 5. The polymerization reaction was conducted using methods well known by those of ordinary skill in the art. The vinyl crosslink agent used in the polymerization was diethylene glycol-bis-(N-vinyl carbamate), and is reported in weight percent based on the total weight of the polymerization mixture.

The silicon hydrogel films of Table 5 were dried released from their respective molds and weighed. The films were then extracted with isopropanol for 2 hrs. The extracted films were then dried at 100° C. for 18-24 hrs at reduced pressure (30 mmHg) and the dry weight recorded. The polymerization and subsequent extraction for each formulation was repeated five times. The extraction data is also reported in Table 5 with the standard deviation for the repeated experiments.

TABLE 4

| Component (parts) | Ex. 6A | Ex. 6B | Ex. 6C | Comp. Ex. 2 |
|---|---|---|---|---|
| M2D39 | 5.3 | 5.3 | 5.3 | 5.3 |
| M1D11 | 4.0 | 4.0 | 4.0 | 4.0 |
| Tris | 23.25 | 23.25 | 23.25 | 23.25 |
| NVP | 41.85 | 41.85 | 41.85 | 41.85 |
| HEMA | 18.6 | 18.6 | 18.6 | 18.6 |
| Propylene glycol | 5.0 | 5.0 | 5.0 | 5.0 |
| AIBN | 0.5 | 0.5 | 0.5 | 0.5 |
| Ex. 2 (wt %) | 0.2 | 0.3 | 0.5 | 0 |
| extraction wt % | 8.7 ± 0.26 | 8.3 ± 0.26 | 7.5 ± 0.2 | 13.5 ± 4.5 |

M1D11 is a monomethacrylate ester of Gelest MCR-C12 having the general formula below.

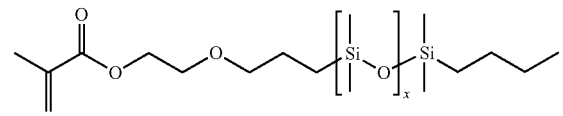

Examples 8A to 8D

Preparation of a Silicon Hydrogels

Silicon hydrogel materials were prepared from the polymerization mixtures listed in Table 6. The polymerization reaction was conducted using methods well known by those of ordinary skill in the art. The vinyl crosslink agent used in the polymerization was diethylene glycol-bis-(N-vinyl carbamate), and is reported in weight percent based on the total weight of the polymerization mixture.

The silicon hydrogel films of Table 6 were dried released from their respective molds and weighed. The films were then extracted with isopropanol for 2 hrs. The extracted films were then dried at 100° C. for 18-24 hrs at reduced pressure (30 mmHg) and the dry weight recorded. The polymerization and subsequent extraction for each formulation was repeated five times. The extraction data is also reported in Table 6 with the standard deviation for the repeated experiments.

TABLE 5

| Component (parts) | Ex. 7A | Ex. 7B | Ex. 7C |
|---|---|---|---|
| M2D39 | 5.3 | 5.3 | 5.3 |
| M1D11 | 4.0 | 4.0 | 4.0 |
| Tris | 23.25 | 23.25 | 23.25 |
| NVP | 41.85 | 41.85 | 41.85 |
| HEMA | 18.6 | 18.6 | 18.6 |
| Propylene glycol | 5.0 | 5.0 | 5.0 |
| AIBN | 0.5 | 0.5 | 0.5 |
| Ex. 2 (wt %) | 0.2 | 0.3 | 0.5 |
| extraction wt % | 8.9 ± 0.72 | 8.4 ± 0.5 | 8.1 ± 1.2 |

The mechanical properties of the resulting hydrogel films of Examples 9A to 9D are listed in Table 7. The formulation of Comparative Example 3 resulted in a weak, fragile material, which could not be mechanically tested, and thus, is not a suitable optical material.

TABLE 6

| Component (parts) | Ex. 8A | Ex. 8B | Ex. 8C | Ex. 8D | Comp. Ex. 3 |
|---|---|---|---|---|---|
| M2D25 | 4.5 | 4.5 | 4.5 | 4.5 | 17.1 |
| Tris | 44.0 | 44.0 | 30.0 | 25.0 | 31.9 |
| NVP | 19.0 | 19.0 | 30.0 | 25.0 | 21.0 |
| DMA | 3.0 | 3.0 | 6.0 | 15.0 | — |
| hexanol | 28.7 | 28.2 | 28.7 | 29.7 | 29.7 |
| Darocure 1173 | 0.3 | 0.3 | 0.3 | 0.3 | 0.3 |
| Ex. 2 (wt %) | 0.5 | 1.0 | 0.5 | 0.5 | 0 |

M2D25 is α,ω-bis(methacryloxybutyl polydimethylsiloxane with DP = 25

TABLE 7

| Example | appearance | modulus (g/mm²) | tensile (g/mm²) | elongation % | Tear g/mm |
|---|---|---|---|---|---|
| 8A | clear | 305 ± 46 | 116 ± 28 | 176 ± 26 | 26 ± 3 |
| 8B | clear | 299 ± 35 | 132 ± 16 | 157 ± 15 | 35 ± 9 |
| 8C | clear | 83 ± 3 | 50 ± 18 | 94 ± 38 | 5 ± 1 |
| 8D | clear | 52 ± 4 | 26 ± 17 | 72 ± 52 | 2 ± 0.5 |

Examples 9A to 9D

Preparation of a Silicon Hydrogels

The silicon hydrogel films of Table 8 were dried released from their respective molds and weighed. The films were then extracted with isopropanol for 2 hrs. The extracted films were then dried at 100° C. for 18-24 hrs at reduced pressure (30 mmHg) and the dry weight recorded. The polymerization and subsequent extraction for each formulation was repeated five times.

The mechanical properties of the resulting hydrogel films of Examples 9A to 9D are listed in Table 9.

TABLE 8

| Component (parts) | Ex. 9A | Ex. 9B | Ex. 9C | Ex. 9D |
|---|---|---|---|---|
| VCa1D11 | 22 | 22 | 22 | 22 |
| Tris | 7.5 | 15 | 20 | 30 |
| NVP | 30.5 | 30.5 | 30.5 | 30.5 |
| HEMA | 8.6 | 8.6 | 8.6 | 8.6 |
| TEGDMA | 2 | 3 | 3 | 3 |
| Ex. 2 | 0.3 | 0.3 | 0.3 | 0.3 |
| Darocure 1173 | 0.3 | 0.3 | 0.3 | 0.3 |
| 3-Me-3-pentanol | 41.5 | 41.5 | 41.5 | 41.5 |

VCa1D11 is a siloxane macromer of formula below

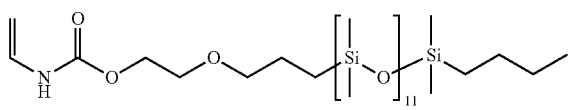

TABLE 9

| Example | clarity | Dk Barrers | modulus (g/mm²) | tensile (g/mm²) | elongation % | Tear g/mm | water content |
|---|---|---|---|---|---|---|---|
| 9A | clear | 44 | 89 ± 16 | 31 ± 9 | 53 ± 16 | <2 | 50.7 |
| 9B | clear | 69 | 104 ± 7 | 49.8 ± 16 | 84 ± 18 | 3 ± 0.5 | 44.1 |
| 9C | clear | 70 | 115 ± 6 | 50 ± 20 | 73 ± 32 | 3 ± 0.5 | 39.5 |
| 9D | clear | 85 | 98 ± 26 | 43 ± 10 | 96 ± 29 | 5 ± 1 | 34.2 |

Examples 10A to 10E

Preparation of a Silicon Hydrogels

The silicon hydrogel films of Table 10 were dried released from their respective molds and weighed. Each component is listed by percent by weight of the polymerization mixture. The films were then extracted with isopropanol for 2 hrs. The extracted films were then dried at 100° C. for 18-24 hrs at reduced pressure (30 mmHg) and the dry weight recorded. The polymerization and subsequent extraction for each formulation was repeated five times.

The mechanical properties of the resulting hydrogel films of Examples 10A to 10E are listed in Table 11.

TABLE 10

| Component (parts) | Ex. 10A | Ex. 10B | Ex. 10C | Ex. 10D | Ex. 10E |
|---|---|---|---|---|---|
| VCa1D11 | — | 10 | — | 7.5 | — |
| M1-MCR-C12 | 10 | — | 10 | — | — |
| VC1D11 | — | — | — | — | 7.5 |
| Tris | 40 | 40 | 35 | 36 | 36 |
| NVP | 35 | 35 | 30 | 44.4 | 44.4 |
| DMA | 5 | 5 | 5 | 3 | 3 |
| HEMA | — | — | 10 | — | — |
| Ma2D37 | 10 | 10 | 10 | 9 | 9 |
| Ex. 2 | 0.3 | 0.3 | 0.3 | 0.15 | 0.15 |
| Darocure 1173 | 0.5 | 0.5 | 0.5 | 0.4 | 0.4 |
| hexanol | 20 | 20 | 20 | 20 | 20 |

VC1D11 and M1-MCR-C12 are siloxane macromers of formula below

VC1D11

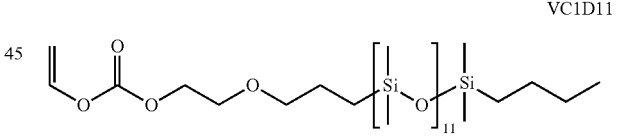

M1-MCR-C12

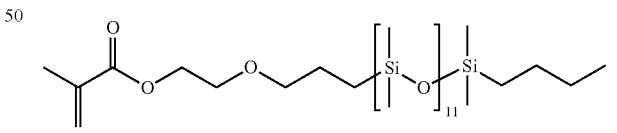

TABLE 11

| Example | clarity | Dk Barrers | modulus (g/mm²) | tensile (g/mm²) | elongation % | Tear g/mm | water content |
|---|---|---|---|---|---|---|---|
| 10A | clear | 96 | 50 ± 10 | — | — | 5 | 40.4 |
| 10B | clear | 89 | 87 ± 9 | — | — | 5 | 48.3 |
| 10C | clear | 79 | 68 ± 6 | 56 ± 14 | 143 ± 38 | 5 ± 1 | 47 |
| 10D | clear | 83 | 73 ± 12 | 50 ± 21 | 117 ± 45 | 4 ± 0.5 | 55.4 |
| 10E | clear | 76 | 90 ± 10 | 65 ± 4 | 140 ± 8 | 4 ± 0.2 | 53.3 |

We claim:

1. A compound of formula

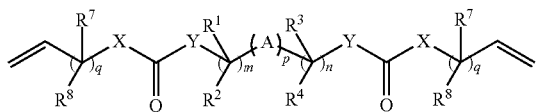

wherein $R^1$, $R^2$, $R^3$, $R^4$, $R^7$ and $R^8$ are independently selected from hydrogen, $C_1$-$C_4$alkyl, $C_1$-$C_2$alkanol or hydroxyl;

A is $[SiR^5R^6O]_w SiR^5R^6$, wherein $R^5$ and $R^6$ are independently selected from $C_{1-4}$alkyl or phenyl, and w is from 0 to 60;

m and n are integers independently selected from 1 to 10; p is 1; and q is an integer from 0 to 6; and $R^9$ is hydrogen, $C_1$-$C_4$alkyl or $C_1$-$C_2$alkanol.

2. The compound of claim 1 wherein m and n are 2 or 3, and $R^1$, $R^2$, $R^3$ and $R^4$ are hydrogen.

3. The compound of claim 2 wherein q is 0, 1 or 2.

4. An ophthalmic lens comprising the reaction product of monomeric units of hydrophilic monomer, monomeric units of silicone-containing lens monomer and at least one crosslink agents of formula

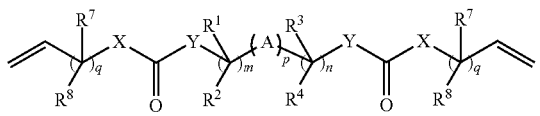

wherein $R^1$, $R^2$, $R^3$, $R^4$, $R^7$ and $R^8$ are independently selected from hydrogen, $C_1$-$C_4$alkyl, $C_1$-$C_2$alkanol or hydroxyl;

A is $[SiR^5R^6O]_w SiR^5R^6$, wherein $R^5$ and $R^6$ are independently selected from $C_{1-4}$alkyl or phenyl, and w is from 0 to 60;

m and n are integers independently selected from 1 to 10; p is 1; and q is an integer from 0 to 6; and $R^9$ is hydrogen, $C_1$-$C_4$alkyl or $C_1$-$C_2$alkanol.

5. The ophthalmic lens of claim 4 wherein the hydrophilic monomer is selected from the group consisting of N-vinyl pyrrolidone, N-vinyl piperidone, N-vinyl-ε-caprolactam, N-vinylimidazolidone, N-vinylsuccinimide, N-vinylforamide and mixtures thereof.

6. The ophthalmic lens of claim 4 wherein the hydrophilic monomer is N-vinyl pyrrolidone.

7. A compound of formula II

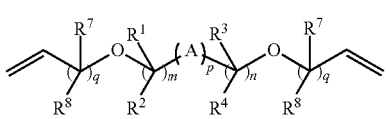

wherein $R^1$, $R^2$, $R^3$, $R^4$, $R^7$ and $R^8$ are independently selected from hydrogen, $C_1$-$C_4$alkyl, $C_1$-$C_2$alkanol or hydroxyl;

A is $[SiR^5R^6O]_w SiR^5R^6$, wherein $R^5$ and $R^6$ are independently selected from $C_{1-4}$alkyl or phenyl, and w is from 0 to 60;

m and n are integers independently selected from 1 to 10; p is 1; and q is an integer from 0 to 6.

8. The compound of claim 7 wherein m and n are 2 or 3, q is 0, 1 or 2 and $R^1$, $R^2$, $R^3$ and $R^4$ are hydrogen.

9. A compound of formula

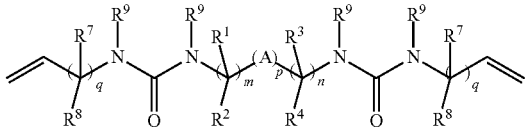

wherein $R^1$, $R^2$, $R^3$, $R^4$, $R^7$ and $R^8$ are independently selected from hydrogen, $C_1$-$C_4$alkyl, $C_1$-$C_2$alkanol or hydroxyl;

A is $[SiR^5R^6O]_w SiR^5R^6$, wherein $R^5$ and $R^6$ are independently selected from $C_{1-4}$alkyl or phenyl, and w is from 0 to 60;

m and n are integers independently selected from 1 to 10; p is 1; and q is an integer from 0 to 6; and $R^9$ is hydrogen, $C_1$-$C_4$alkyl or $C_1$-$C_2$alkanol.

10. The compound of claim 9 wherein m and n are 2 or 3, and $R^1$, $R^2$, $R^3$ and $R^4$ are hydrogen.

11. An ophthalmic lens comprising the reaction product of monomeric units of hydrophilic monomer, monomeric units of silicone-containing lens monomer and at least one crosslink agents of formula

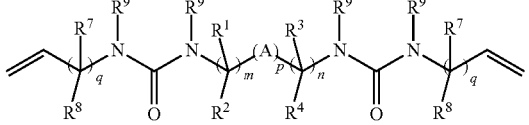

wherein $R^1$, $R^2$, $R^3$, $R^4$, $R^7$ and $R^8$ are independently selected from hydrogen, $C_1$-$C_4$alkyl, $C_1$-$C_2$alkanol or hydroxyl;

A is $[SiR^5R^6O]_w SiR^5R^6$, wherein $R^5$ and $R^6$ are independently selected from $C_{1-4}$alkyl or phenyl, and w is from 0 to 60;

m and n are integers independently selected from 1 to 10; p is 1; and q is an integer from 0 to 6; and $R^9$ is hydrogen, $C_1$-$C_4$alkyl or $C_1$-$C_2$alkanol.

12. The ophthalmic lens of claim 11 wherein the hydrophilic monomer is selected from the group consisting of N-vinyl pyrrolidone, N-vinyl piperidone, N-vinyl-ε-caprolactam, N-vinylimidazolidone, N-vinylsuccinimide, N-vinylforamide and mixtures thereof.

13. The ophthalmic lens of claim 11 wherein the hydrophilic monomer is N-vinyl pyrrolidone.

* * * * *